United States Patent [19]
Morgan

[11] 3,991,473
[45] Nov. 16, 1976

[54] WATER RETRACTOR

[75] Inventor: Ward Morgan, Foster City, Calif.

[73] Assignee: Health-Kit Corporation, Burlingame, Calif.

[22] Filed: Oct. 23, 1974

[21] Appl. No.: 517,134

[52] U.S. Cl. .................................................... 32/22
[51] Int. Cl.[2] ......................................... A61C 19/02
[58] Field of Search................. 251/63.4, 63.5, 63.6, 251/62; 32/22

[56] References Cited

UNITED STATES PATENTS

| | | | |
|---|---|---|---|
| 307,516 | 11/1884 | Anson | 251/DIG. 1 |
| 3,290,003 | 12/1966 | Kessler | 251/63.6 |
| 3,718,974 | 3/1973 | Buchtel et al. | 32/22 |

*Primary Examiner*—Robert Peshock
*Attorney, Agent, or Firm*—Townsend and Townsend

[57] ABSTRACT

The present invention provides apparatus for retracting water from the water supply line of a dental tool having a control valve actuated by pressurized pilot air. The apparatus retracts the water from the water supply line when the control valve is deactuated to prevent unwanted discharge of the water from the tool when the tool is no longer being used.

13 Claims, 5 Drawing Figures

WATER RETRACTOR

BACKGROUND OF THE INVENTION

The present invention relates to dental tools, and in particular to apparatus for retracting water from the water supply line of a dental tool when the tool has been deactivated.

The relatively cumbersome and complex valve assemblies traditionally used to control the flow of dental fluids to various dental tools are rapidly being replaced by smaller and more efficient diaphragm valves. An example of the use of such diaphragm control valves is illustrated in the patent to Austin, U.S. Pat. No. 3,638,310 which shows several discrete valve blocks mounted in series to form a dental tool control. A problem with such diaphragm valves and other dental control valves known in the art is that when a dental tool is deactivated, water will often continue to be discharged from the tool for a short period of time due to excess water in the water supply line running from the control valve to the tool. This excess water results from expansion of the water supply line when it is under pressure, and the excess water is discharged when the pressure is relieved. Water from the supply line may also be discharged when not desired by the siphon effect caused by operation of the turbine or chip air in the tool.

In order to solve this problem, control valves such as that illustrated by Austin incorporate an extra valve assembly which retracts a portion of the water from the water supply line to a given tool when that tool is deactivated. The extra valve assembly for water retraction ordinarily used in such control valves, employs a balloon diaphragm to retract the water. This balloon diaphragm is operated by air at relatively high pressure, greater than the line pressure used to operate the dental tools. Hence, a separate high pressure line is required to operate the water retraction assembly.

The diaphragm control valves of the type illustrated in the patent to Austin use a plurality of discrete valves, one valve for each dental tool, with separate supply lines to each valve. The addition of an extra valve for water retraction with its own air pressure line does not sufficiently detract from the efficiency of the apparatus to render its use unacceptable. However, dental control valves have recently been developed wherein a plurality of dental tools are controlled from a single laminated control block, as illustrated in my copending patent application for DENTAL TOOL CONTROL ASSEMBLY, filed Apr. 13, 1973, Ser. No. 351,052, and herein incorporated by reference. The incorporation of an extra valve assembly as described above with its own air supply line for the sole purpose of water retraction would defeat the purpose and advantages of such a unitary control block to a large degree, and the use of such an extra valve with a unitary control valve is therefore undesirable.

SUMMARY OF THE INVENTION

The present invention provides apparatus for retracting water from the water supply line of a dental tool having a control valve actuated by pressurized pilot air. The apparatus includes a piston cylinder having inlet and outlet ports in one end connected to the water supply line so that water flowing through the supply line to the tool flows through that end of the cylinder and on to the tool currently in use. The other end of the cylinder communicates with the pilot air passage. A piston is provided which is axially translatable within the piston cylinder and conformed to the sides of the cylinder to separate the water in one end from the pilot air in the other end. The piston is translated to a first position adjacent the one end of the cylinder when the control valve is actuated by the pressure of the pilot air. The piston is moved from its first position to a second position adjacent the other end of the cylinder when the control valve is deactuated. A chamber is interposed in the water supply line adjacent the inlet port. A ball is confined within the chamber and has a diameter greater than the diameter of the inlet port so that the water pressure in the chamber will normally seat the ball against the inlet port and prevent the flow of water into the cylinder. A pin is fixed to the piston and adapted to extend through the first port when the piston is in its first position to unseat the ball and allow water to flow through the cylinder and on to the tool in use. The pin has a preselected length so that partial translation of the piston from the first position to the second position when the tool is deactuated allows the ball to seat against the first port to prevent the flow of water to the cylinder. Further translation of the piston towards the second position retracts water from the water supply line running from the control block to the dental tool through the second port and back into the cylinder.

The apparatus of the present invention can be incorporated directly into unitary laminated control blocks as described above. Hence, an extra valve assembly solely for the purpose of retracting water from the tools after they have been used is not required, and the advantages of such a unitary conttrol block are preserved. Furthermore, this apparatus could be used with control valves of the Austin type as a discrete water retraction assembly. The apparatus of the present invention operates directly off of pilot or line air and does not require a separate high pressure air supply.

The novel features which are characteristic of the invention, both as to organization and method of operation, together with further objects and advantages thereof will be better understood from the following description considered in connection with the accompanied drawings in which preferred embodiments of the invention are illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
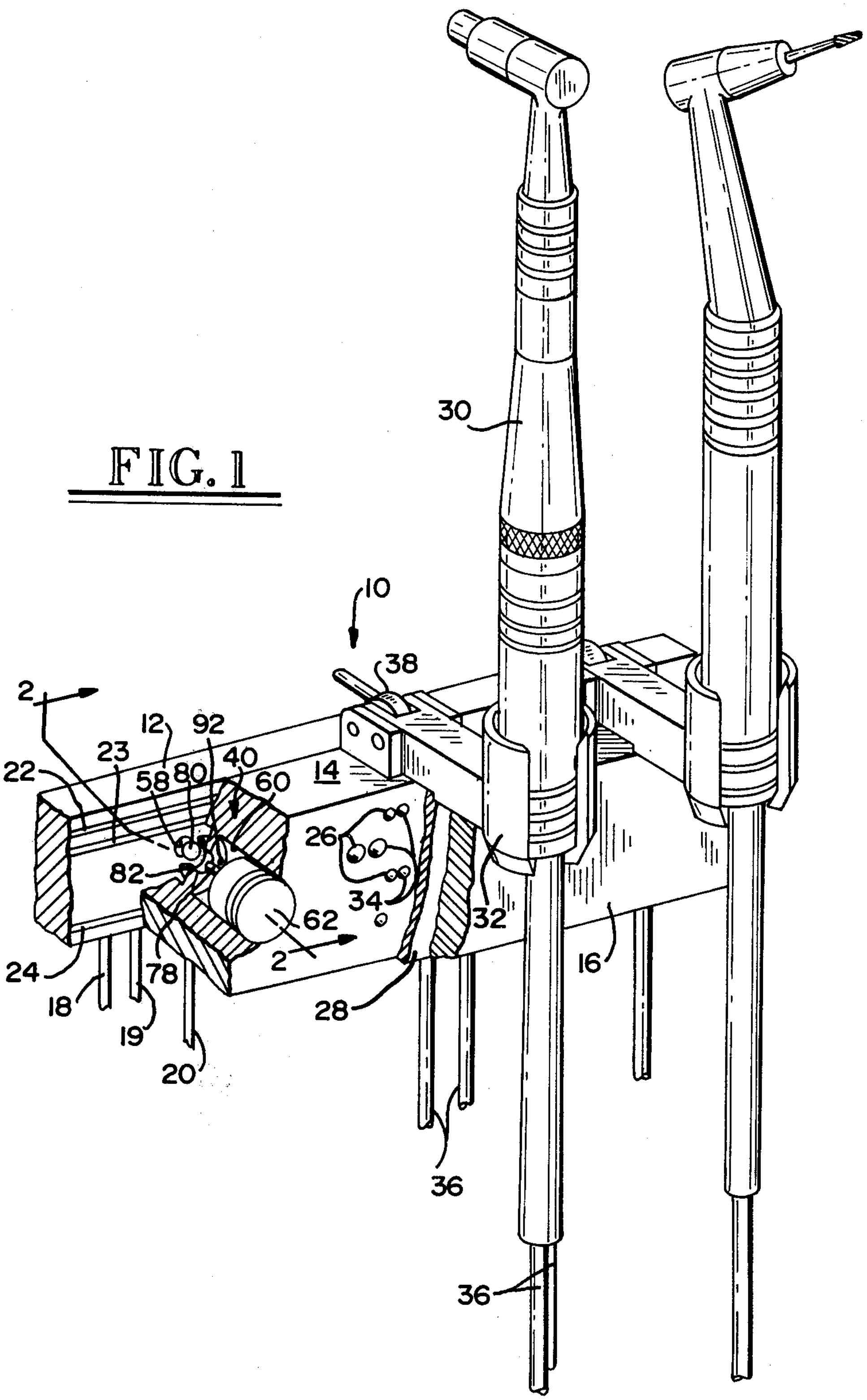
FIG. 1 is a fragmentary perspective view illustrating the incorporation of the apparatus of the present invention in a dental tool control block.

A laminated dental tool control block 10 incorporating the features of the present invention is illustrated by way of reference to FIG. 1. Control block 10 includes three basic laminae, specifically, a manifold lamina 12, a valve lamina 14, and a pilot lamina 16. Various dental fluids such as chip air, water and drive gas are provided to manifold lamina 12 through tubes such as 18–20. The dental fluids, with the exception of water, flow through internal passages in maifold lamina 12 to grooves 22–24 formed at the interface between manifold lamina 12 and valve lamina 14. A plurality of sets of passages such as 26 are provided through valve lamina 14 from manifold lamina 12 to pilot lamina 16. One set of passages is provided for each dental tool. The dental fluids pass from the grooves 22–24 in manifold lamina 12 to the interface between valve lamina 14 and pilot lamina 16 through passages 26.

A diaphragm sheet 28 is disposed between valve lamina 14 and pilot lamina 16. As disclosed in my copending patent aplication for DENTAL TOOL CONROL ASSEMBLY, Ser. No. 351,052 and herein incorporated by reference, when one dental tool is in use, pilot air or a similar pressurized gas will bias diaphragm sheet 28 against ports 26 for the other dental tools which are not in use to prevent the flow of dental fluids to those tools. One of the dental tools such as 30 is removed from its holder 32 for use, and diaphragm 28 will not be pressed against the ports 26 associated with that tool. Rather, the dental fluids will be allowed to flow from ports 26 to outlet ports 34 and on to the tool through tubes such as 36. If another tool is removed from its holder 32 but is not intended for use, the holder can be locked in its down position by cam 38. In this manner control block 10 distributes the dental fluids to the dental tool currently in use, cutting off the flow of such fluids to unused tools.

Figure 2:
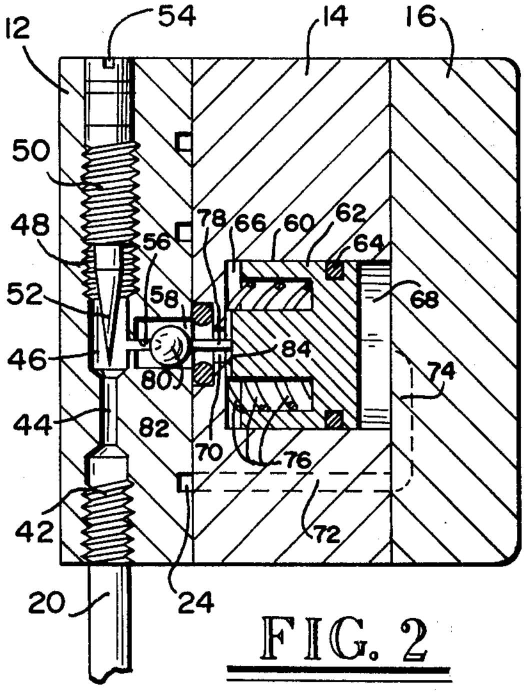
FIG. 2 is a cross sectional view of the apparatus of the present invention taken along lines 2—2 of FIG. 1 as one of the dental tools is in operation.

The water retraction apparatus of the present invention is illustrated generally at 40 in FIG. 1, and in more detail by way of reference to FIG. 2. Water is supplied to manifold lamina 12 through tube 20 connected to threaded fitting 42 in the bottom of the manifold lamina. The water passes up through passage 44, which has a wide potion 46 adjacent the middle of manifold lamina 12. The upper end 48 of wide portion 46 is threaded, and a needle valve 50 is threadably engaged therewith. The point 52 of needle valve 50 projects into wide portion 46 of passage 44 to control the flow of water therethrough. The aft end of needle valve 50 has a slot 54 so that the relative position of the needle valve can be selected.

Water flows out of the wide portion 46 of passage 44 through a smaller passage 56 into chamber 58. The flow rate of the water is controlled by needle valve 50 to adapt to the local water tap pressure. Passage 56 is slightly angularly disposed with respect to manifold lamina 12. Chamber 58 is slightly misaligned with respect to passage 44, and FIGS. 2–4 are slightly modified cross-sectional view as indicated in FIG. 1 adapted to illustrate all of the features of the present invention.

A piston cylinder 60 is provided in valve lamina 14, and piston 62 is disposed within the cylinder. Th sidewalls of piston 62 are conformed to the sides of cylinder 60 and a sealing ring 64 is also provided to separate one end 66 of cylinder 60 from the other end 68. Fluid communication between the one end 66 of cylinder 60 and chamber 58 is provided through an inlet port 70 therebetween.

When a dental tool is being operated, pilot air under pressure is supplied to the other end 68 of cylinder 60 from groove 24 through passage 72, 74 formed in valve lamina 14 and pilot lamina 16. The pressure of the pilot air biases piston 62 to the left to its first position as illustrated in FIG. 2. In this first position ring 76 in the one end 66 of cylinder 60 is compressed but the pressure of the pilot air maintains the piston in its first position. A pin 78 in the end of piston 62 facing the one end 66 of cylinder 60 extends through inlet port 70 to unseat ball 80 from O-ring 82. This allows the water to flow from chamber 58 through port 70 and radially outwardly through a groove 84 in piston 62 to the one end 66 of cylinder 60. As will be illustrated hereinafter, the water in the one end 66 of cylinder 60 passes on to the dental tool in use when piston 62 is in its far left position to allow for normal operation of the dental tool.

Figure 3:
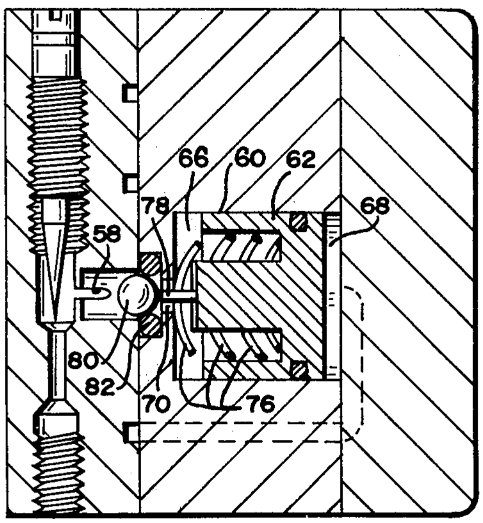
FIG. 3 is a cross sectional view similar of that of FIG. 2 illustrating partial movement of the piston of the present invention after deactuation of the dental tool.
Figure 4:
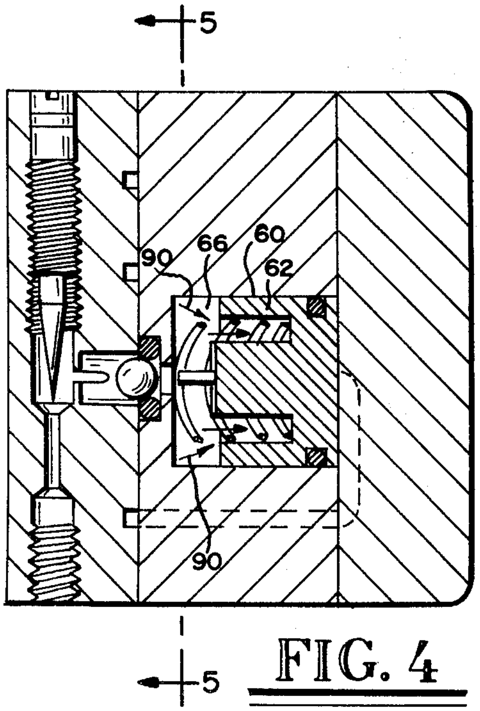
FIG. 4 is a cross sectional view similar to that of FIGS. 2 and 3 illustrating full movement of the piston after the dental tool is deactuated.

When the dental tool is deactivated, pilot air will no longer be supplied to the other end 68 of cylinder 60, and piston 62 will begin to traverse to the right as illustrated in FIG. 3 to relieve the compression of spring 76. Pin 78 is of a preselected length so that ball 80 is allowed to seat on O-ring 82 to prevent water from flowing from chamber 58 into end 66 of cylinder 60 before piston 62 has moved from its first position at the left of cylinder 60 to its second position at the right thereof.

Figure 5:
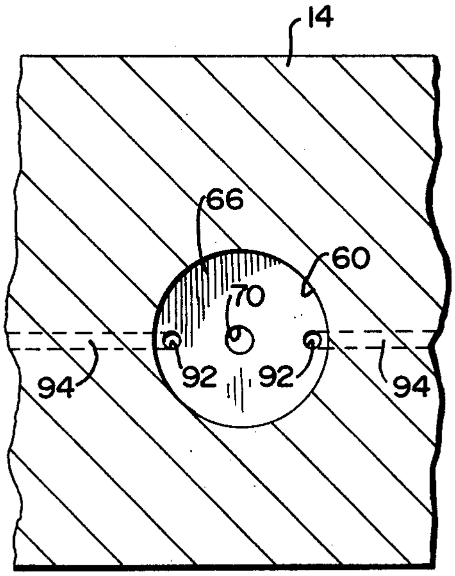
FIG. 5 is a cross sectional view taken along lines 5—5 of FIG. 4.

As piston 62 is motivated further to the right by the expansion of spring 76, water is drawn back into the one end 66 of cylinder 60 as illustrated by arrows 90 from the water line leading to the dental tool (FIG. 4). AS shown in FIG. 5, the one end 66 of cylinder 60 is provided with a pair of outlet ports 92 on either side of inlet port 70 (see also FIG. 1) leading to this water line. When one of the dental tools is in operaton, water flows into the end 66 of cylinder 60 through inlet port 70 and out through the respective outlet ports 92. Outlet ports 92 lead to a pair of oppositely directed grooves 94 running along the face of valve lamina 14 to distribute the water to the various sets of ports 26 as with the other dental fluids. It is apparent that grooves 94 could be formed in the manifold plate as well as the valve plate, but in any case should be formed at the interface therebetween for ease of construction. When piston 62 moves to its second position at the far right of cylinder 60, the water is drawn from the water supply line leading to the dental tool through groove 94 and back into cylinder 60 through outlet ports 92. Thus, a preselected amount of water is retracted from the dental tool and excess water will not be inadvertently discharged therefrom.

While a preferred embodiment of the present invention has been illustrated in detail, it is apparent that modifications and adaptations of that embodiment may occur to those skilled in the art. For example, it is apparent that the water retraction apparatus of the present invention could be used with other dental tool control assemblies not employing laminated control blocks. However, it is to be expressly understood that such modifications and adaptations are within the spirit and scope of the present invention, as set forth in the following claims.

What I claim as new is:

1. Apparatus for retracting water from the water supply line of a dental tool having a control valve, said apparatus comprising:

a piston cylinder having first and second ports in one end connected to the water supply line so that water flowing through the water supply line to the tool flows into the cylinder through the first port and out of the cylinder through the second port and to the tool;

means for supplying a pressurized gas to the other end of the cylinder upon actuation of the control valve;

a piston axially translatable within the piston cylinder and conformed to the sides of the cylinder to separate the water in one end of the cylinder from the pressurized gas at the other end of the cylinder, said piston being translated to a first positon adjacent said one end of the cylinder when the control valve is actuated by the pressurized gas;

means for biasing the piston from said first position to a second position adjacent the other end of the cylinder when the control valve is deactuated;

a chamber interposed in the water supply line and communicating with the first port, said chamber having a transverse dimension greater than the diameter of said first port;

a ball confined within the chamber and having a diameter greater than the diameter of the first port, the water pressure in said chamber adapted to normally seat the ball against the first port to prevent the flow of water to the cylinder through said first port; and a pin fixed to the piston and adapted to extend through the first port when the piston is in said first position to unseat the ball and allow water to flow into the cylinder through the first port and out of the cylinder through the second port and to the tool, said pin having a preselected length so that partial translation of the piston from the first position to the second position allows the ball to seat against the first port to prevent the flow of water to the cylinder and further translation of the piston toward said second position retracts water from the water supply through the second port and into the cylinder.

2. Apparatus as recited in claim 1 wherein the control valve comprises a laminated block including a manifold lamina, a valve lamina, ad a pilot lamina, and wherein said piston cylinder is formed in said valve lamina.

3. Apparatus as recited in claim 1 wherein the first port is axially disposed with respect to the cylinder and the second port is non-axially disposed with respect to the cylinder.

4. Apparatus as recited in claim 1 and additionally comprising an O-ring disposed within the chamber and circumscribing the first port, said ball adapted to seat on said O-ring.

5. Apparatus as recited in claim 1 wherein the control valve is actuated by pilot air, and wherein the pressurized gas comprises said pilot air.

6. Apparatus as recited in claim 1 wherein the end of the piston facing said one end of the cylinder has an annular depression formed therein, and wherein said bias means comprises a coil spring adapted to extend into the annular depression and contact the piston.

7. Apparatus as recited in claim 6 and additionally comprising a groove formed in the surface of the piston adjacent said one end of the cylinder interior of the annular depression, the portion of said piston interior of said annular depression adapted to contact said one end of the cylinder in said first position, said groove providing fluid communication for the water from the first port to the second port.

8. In a laminated elongate valve block for controlling the flow of various dental fluids such as water and pressurized air to a plurality of dental instruments, said valve block including manifold, valve and pilot lamina in series, said dental fluids adapted to enter and pass through passages in the manifold lamina to supply grooves at the itnerface between the manifold and the valve laminae, and thereafter through corresponding sets of passages in the valve lamina spaced along the length of the block, each set of passages adapted to supply the fluids to one of the respective dental tools, and a diaphragm sheet intermediate the valve and pilot laminae to control the flow of dental fluids to the respective dental tools using pilot air applied through the pilot lamina, improved means for conrolling the flow of water to the dental tools which includes retraction of excess water from the tool when it is deactivated, said controlling means comprising:

a chamber interposed in the water passage in the manifold lamina at the interface between the manifold lamina and the valve lamina;

a piston cylinder formed in the valve lamina;

an inlet port formed in the valve lamina and providing fluid communication from the chamber to one end of the piston cylinder;

a pair of water supply grooves formed at the interface between the manifold and the valve laminae and extending in opposite directions lengthwise along the valve block from positions adjacent the inlet port;

a pair of outlet ports providing fluid communication from said one end of the cylinder to the respective water supply grooves;

a passage through the valve block for supplying pilot air under pressure to the other end of the cylinder upon actuation of a dental tool;

a piston axially translatable within the piston cylinder and conformed to the sides of the cylinder to separate the water in one end of the cylinder from pilot air in the other end, said piston being translated to a first position adjacent said one end of the cylinder when the control valve is actuated by the pressure of the pilot air;

means for biasing the piston from said first position to a second position adjacent the other end of the cylinder when the control valve is deactuated;

a ball confined within the chamber and having a diameter greater than the diameter of the inlet port so that the water pressure in the chamber normally seats the ball against the inlet port to prevent the flow of water to the cylinders through said inlet port; and a pin fixed to the piston and adapted to extend through the inlet port when the piston is in said first position to unseat the ball and allow water to flow into the cylinder through the inlet port and out of the cylinder through the outlet ports to the water supply grooves, said pin having a preselected length so that partial translation of the piston from the first to the second positon allows the ball to seat against the inlet port to prevent the flow of water to the cylinder and further translation of the piston towards such second position retracts water from the water supply groove back through the outlet ports and into the cylinder.

9. A valve block as recited in claim 8 wherein the bias means comprises a spring located in said one end of the cylinder in contact with the piston, said spring being compressed when the piston is in the first position to bias the piston to the second position.

10. A valve block as recited in claim 8 and additionally comprising an O-ring disposed within the chamber and circumscribing the inlet port, said ball adapted to seat on said O-ring.

11. Apparatus for retracting water from the water supply line of a dental tool having a control valve, said apparatus comprising:

a piston cylinder having first and second ports in one end connected to the water supply line so that water flowing through the water supply line to the tool flows into the cylinder through the first port and out of the cylinder through the second port and to the tool;

means for supplying a pressurized gas to the other end of the cylinder upon action of the control valve;

a piston axially translatable within the piston cylinder and conformed to the sides of the cylinder to separate the water in one of the cylinder from the pressurized gas at the other end of the cylinder, said piston being translated to a first position adjacent said one end of the cylinder when the control valve is actuated by the pressurized gas;

means for translating the piston from said first position to a second position adjacent the other end of the cylinder when the conrol valve is deactuated; and means coupled to said piston for closing said water supply line upstream of the cylinder upon patial translation of said piston from said first position to said second positon;

said piston creating a negative pressure on the water supply line downstream of the cylinder after closing of said water supply line upstream of the cylinder as said piston completes its translation from said first position to said second position thereby retracting water from the water supply line back downstream of the cylinder backthrough the second port and into the cylinder.

12. Apparatus as recited in claim 11, wherein the closing means comprises:

sealing means disposed adjacent the first port and upstream of the cylinder for closing said first port to prevent water flow therethrough; and a pin fixed to the piston and adapted to extend through the first port when the piston is in said first position to keep said sealing means from closing said first port.

13. Apparatus as recited in claim 12, wherein the sealing means comprises:

a chamber interposed in the water supply line and communicating with the first port, said chamber having a transverse diameter greater than the diameter of said first port; and a ball confined within the chamber and having a diameter greater than the diameter of the first port, the water pressure in said chamber adapted to normally seat the ball against the first port to prevent the flow of water to the cylinder through said first port.

* * * * *